United States Patent [19]
Schwerin

[11] 3,740,102
[45] June 19, 1973

[54] MOTOR VEHICLE BRAKING ARRANGEMENT

[75] Inventor: Günther Schwerin, Fellbach, Germany

[73] Assignee: Robert Bosch GmbH, Stuttgart, Germany

[22] Filed: Feb. 3, 1972

[21] Appl. No.: 223,206

[30] Foreign Application Priority Data
Feb. 27, 1971 Germany.................. P 21 09 379.8

[52] U.S. Cl........................ 303/13, 303/7, 188/3 R
[51] Int. Cl............................................. B60t 15/16
[58] Field of Search................... 303/7, 13; 188/3 R

[56] References Cited
UNITED STATES PATENTS

| | | | |
|---|---|---|---|
| 3,441,108 | 4/1969 | Boueil | 188/3 R |
| 2,262,844 | 11/1941 | Goepfrich | 303/7 X |
| 1,947,903 | 2/1934 | Dickey | 303/7 X |
| 3,606,495 | 9/1971 | Bion | 303/7 X |

FOREIGN PATENTS OR APPLICATIONS

| | | | |
|---|---|---|---|
| 334,592 | 9/1930 | Great Britain | 303/8 |
| 650,695 | 9/1937 | Germany | 303/7 |
| 1,353,955 | 1/1964 | France | 303/7 |

*Primary Examiner*—M. Henson Wood, Jr.
*Assistant Examiner*—John J. Love
*Attorney*—Michael S. Striker

[57] ABSTRACT

A motor vehicle is provided with a mechanical brake system which is to supply, when actuated, the impulse for operating the hydraulic brake system of a trailer which is to be towed by the motor vehicle. The mechanical brake system of the motor vehicle has a pair of articulately connected linkage rods which define with one another an angle and a pull rod connected with at least one of the linkage rods and acting upon an actuating valve of the hydraulic brake system so as to operate the valve when the mechanical brake system is actuated.

6 Claims, 1 Drawing Figure

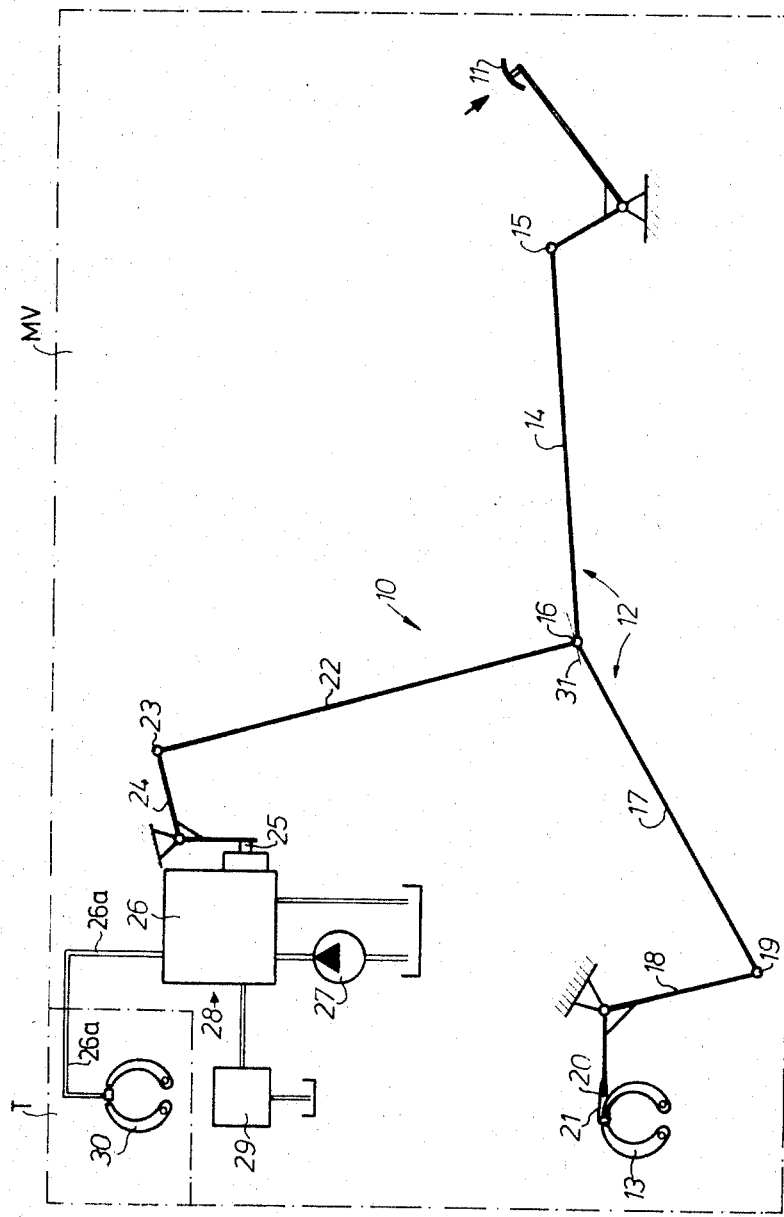

MOTOR VEHICLE BRAKING ARRANGEMENT

BACKGROUND OF THE INVENTION

The present invention relates generally to a motor vehicle braking arrangement, and more particularly to a braking arrangement in which operation of the hydraulic brake system of a trailer is initiated when the mechanical brake system of a motor vehicle for pulling the trailer is operated.

An arrangement of this type is already known. Its purpose is to permit the operation of the hydraulic brake system of a trailer whenever the mechanical brake system of a motor vehicle towing the trailer is operated, with the mechanical brake system upon such operation providing the necessary impulse which effects operation of a valve in the hydraulic brake system. The arrangement known from the prior art utilizes in the mechanical brake system of the motor vehicle two mutually parallel pull rods which are pivotably connected to a toggle lever, the latter in turn being connected with the control member of a brake valve which actuates the hydraulic brake system of a trailer. One of the pull rods is additionally pivoted to the brake pedal of the motor vehicle, that is the pedal which actuates the mechanical brake system, and the other pull rod is pivoted to a cam arm provided on a brake unit which is controlled by and forms part of the mechanical brake system.

This known construction has certain disadvantages, one of which is the fact that the brake pedal, the hydraulic brake valve and the brake unit are fixed in their spatial relationship, so that the arrangement of the brake valve for instance on a valve block which is present on agricultural tractors or the like, is made rather difficult, because such a valve block is usually located at a substantially higher level than the brake unit itself. Moreover, the forces which are being transmitted via the pull rods act upon the toggle lever in a sense to bend the same, which requires that the various components be of sufficient strength to be capable of resistint the bending tendency. This, however, adds of course to the weight of the arrangement and such elements additionally increase the springy tendency which is in any case inherent in mechanical brake systems.

A further disadvantage of the known construction is the fact that such heavy bending-resistent elements are unsuitable in particular for transmitting forces over relatively large distances. The reason for this is that they decrease the possibility of transmitting substantial brake forces in mechanical brake systems of relatively light construction. Moreover, radial forces act upon the control member of the hydraulic brake valve, forces which are caused by the weight of the pull rods and by moments of force resulting from a non-parallel location of the pull rods. Such radial forces, however, tend to adversely influence proper operation of the braking arrangement and may well lead to "jerky" braking rather than to a smooth braking effect.

SUMMARY OF THE INVENTION

It is therefore a general object of the present invention to provide an arrangement which overcomes the dsiadvantages of the prior art.

More particularly, it is an object of the present invention to provide an improved motor vehicle braking arrangement of the general type here under discussion which is not possessed of these aforementioned disadvantages.

An additional object of the invention is to provide such a braking arrangement which is of particularly simple construction.

Still another object of the invention is to provide such a braking arrangement which assures reliable and trouble-free operation and is of simple construction even if it is necessary to transmit forces over relatively large distances between the brake pedal, the brake unit of the motor vehicle, and the brake valve of the hydraulic brake system.

In pursuance of these and other objects which will become apparent hereafter, one feature of the invention resides, in a motor vehicle braking arrangement, in a combination of a hydraulic brake system including an actuating valve, and a mechanical brake system operative independently but arranged to initiate operation of the hydraulic brake system. The mechanical brake system comprises a pair of articulately connected linkage rods defining with one another an angle and a pull rod operatively associated with at least one of the linkage rods and with the actuating valve.

A braking arrangement thus constructed permits a particularly simple and reliable operation of the brake valve of the hydraulic brake system, and relatively substantial distances between the individual components can be bridged in a very simple manner while maintaining proportionality of forces. The arrangement is particularly suitable in terms of the manner in which it facilitates the spatial arrangement of brake pedal and hydraulic brake valve with reference to one another. It is especially advantageous to utilize pull rods because this makes it possible to construct the arrangement in such a manner that it is of light weight but yet assures the possibility of transmitting substantial forces while preventing an excessive increase in the inherent springy tendency of the rod linkages.

The selection of the angles between the pull rod and the respective linkage rods can be chosen rather freely and advantageously and by appropriate choosing of these angles it can be assured that wear in the mechanical linkage rods does not influence the operation of the brake actuating valve in the hydraulic brake system. Moreover, by such proper selection the size of the individual forces being transmitted can be also influenced.

The novel features which are considered as characteristic are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The FIGURE is a simplified diagrammatic illustration showing one embodiment of the invention.

DESCRIPTION OF THE PREFERRED EMBODIMENTS

Discussing the drawing in detail, and firstly the embodiment illustrated in the FIGURE, it will be seen that the brake arrangement is designated in toto with reference numeral 10. For purposes of orientation I have shown in broken lines the diagrammatic outlines of a motor vehicle MV and of a trailer T. No further details of the construction of the vehicles themselves are necessary because these are well known per se.

A brake pedal 11 is provided which in conventional manner is a foot-operated pedal and is provided on the motor vehicle MV. The brake pedal 11 is connected with a diagrammatically illustrated brake unit 13 (that is a brake unit for one of the wheels of the motor vehicle) via a mechanical brake linkage 12. The latter utilizes a first linkage rod 14 and a second linkage rod 17; the linkage rods 14 and 17 are articulately connected at 16 and the rod 14 is further articulately connected to the brake pedal 11 at 15. There is further provided a rod 18 which is mounted on the motor vehicle MV and is articulately connected at 19 with the rod 17 and at 20 with an arm 21 which operates the brake unit 13.

At 16 there is connected with the rods 14 and 17 a pull rod 22, so that 16 is a point common to all three rods 14, 17 and 22. At 23 the pull rod 22 is articulated to an arm 24 which is angled and mounted on the motor vehicle MV as illustrated for pivotal movement with a free portion of the arm 24 being operatively associated with a pressure-operated member 25 of a hydraulic brake valve 26. No details of the valve 26 are necessary because such valves are known per se to those skilled in the art and the particular construction of the valve does not form a part of the present invention. It is to be noted, however, that the brake valve 26 is interposed in a hydraulic circuit 28 provided with a pump 27, a user device 29 and, connected via the conduit 36a with a hydraulically operated brake unit 30 which is provided on the trailer T, for instance on one of the wheels thereof.

In operation of this arrangement, and assuming that the mechanical brake system of the motor vehicle MV is not being utilized at the moment, the brake units 13 and 30 will be in non-operated condition in which they do not exert a braking effect. When the brake pedal 11, is depressed, however, a corresponding proportional force is exerted via the mechanical linkage 12 upon the brake unit 13 of the motor vehicle MV. Because the pull rod 22 is operatively associated with the member 25 via the member 24 an arm of which pushes against the member 25 when a pull is exerted upon the pull rod 22, the linkage rods 14 and 17 cannot upon depressing of the pedal 11 move to an axially aligned position. However, they do exert via the pull rod 22 and the member 24 a force upon the member 25 of the valve 26, a force which is transmitted as a pressure proportionate to the forces acting upon the rods 14 and 17. The valve 26, in turn, controls the pressure in the brake unit 30 proportional to the force acting upon the member 25 so that the hydraulically braked trailer T receives a braking effect which is always proportional to the braking effect which is being exerted on the motor vehicle MV.

Because of the particular positioning of the pull rod 22 with reference to the rods 14 and 17, wear on the rods does not influence the actuation of the valve 26, because if wear occurs in the linkage 12 and in the brake 13 the articulate connecting point 16 will shift in a path 31 which in effect does not change the angle between the rod 22 and the rods 14 and 17, respectively.

These angles, incidentally, should be obtuse angles and it is advantageous if the angle included between the rod 22 and the rod 14 on the one hand, and the rod 22 and the rod 17 on the other hand, are at least substantially equal.

The arrangement according to the present invention is suitable for single-wheel and dual-wheel braking. In the case of single-wheel braking, an additional brake unit is provided cooperating with an additional linkage. The two separate linkages jointly act upon the member 25 of the valve 26 with the individual forces being additive in their effect upon the member 25.

It will be appreciated that other modifications are also possible within the scope and intent of the invention. Thus, it is possible to omit the elements 18 and 24 which, in relationship to the rods 14, 17 and 22 are very small and do not have the disadvantages discussed above with respect to the prior art. The elements 18 and 24 can be replaced with triangular components with cams or the like.

In most instances, it is most advantageous to have the rods 14 and 17 constructed as pull rods. It is, however, possible in case of certain relationships of the brake pedal 11 and the brake unit 13 with reference to one another, to construct the rods 14 and 17 as push rods which is particularly advantageous if they are particularly short and the possibility of danger of their bending (assuming light weight construction) is eliminated as a result of such short length or if spatial requirements so dictate. If the rods 14 and 17 are constructed as push rods, the pull rod 22 which must bridge a relatively large distance, will define acute angles with the push rods rather than the obtuse angles which have been illustrated in the exemplary embodiments. The arrangement according to the present invention can be used with particular advantage in motor vehicles which are provided with mechanical braking arrangements, and which are only later additionally to be provided with a hydraulic brake system for braking of a trailer. In this case, it is simply necessary to replace the elongated rod which normally extends between the points 15 and 19 in such conventional constructions, with the arrangement according to the present invention, to thereby effect the desired conversion.

It will be understood that each of the elements described above, or two or more together, may also find a useful application in other types of constructions differing from the types described above.

While the invention has been illustrated and described as embodied in a motor vehicle braking arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a motor vehicle braking arrangement, in combination, a hydraulic brake system including an actuating valve; and a mechanical brake system operative independently of but arranged to initiate operation of said hydraulic brake system, comprising a pair of articulately connected linkage rods defining with one another an angle, a brake pedal carried by a pedal arm which is pivotably mounted on a vehicle chassis and connected with one of said linkage rods, and a pull rod operatively associated with at least one of said linkage rods and with said actuating valve so as to operate the latter when said linkage rods undergo relative movement in response to depressing of said brake pedal.

2. An arrangement as defined in claim 1, wherein said linkage rods and said pull rod are articulately connected at a point common to them all.

3. An arrangement as defined in claim 2, wherein said linkage rods define with one another, and said pull rod defines with each of said linkage rods, a respective obtuse angle.

4. An arrangement as defined in claim 3, wherein the obtuse angles defined between said pull rod and the respective linkage rods are at least substantially equal.

5. An arrangement as defined in claim 1, said mechanical brake system further including at least one brake operatively connected with one of said linkage rods for actuation thereby; and further comprising a pair of force-transmitting elements respectively interposed between and operatively associated with said brake and one linkage rod and said valve and pull rod, respectively.

6. An arrangement as defined in claim 1, in combination with a self-propelled motor vehicle and a trailer vehicle of which said mechanical brake system and said hydraulic brake system are respective components.

* * * * *